April 16, 1968 L. B. VENABLE 3,378,104
AIR-OIL SEPARATORS FOR USE IN GAS TURBINE ENGINES
Filed March 8, 1966
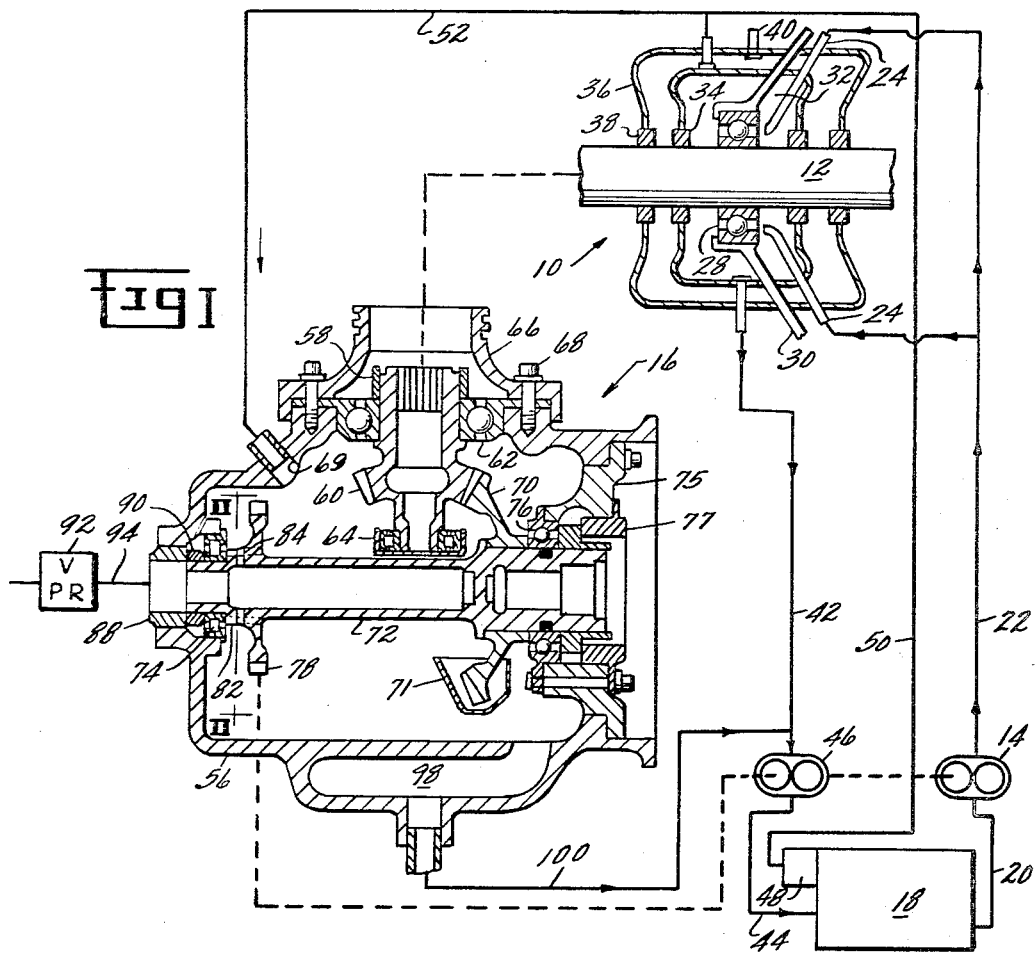
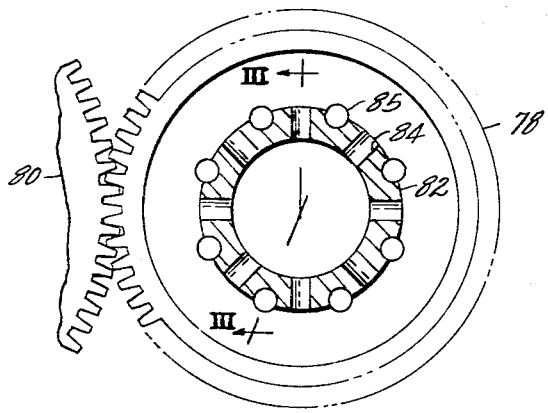
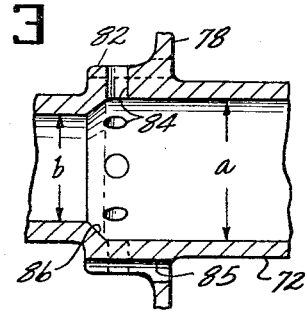
INVENTOR.
LAWRENCE B. VENABLE
BY
ATTORNEY

United States Patent Office 3,378,104
Patented Apr. 16, 1968

3,378,104
AIR-OIL SEPARATORS FOR USE IN GAS TURBINE ENGINES
Lawrence B. Venable, Cincinnati, Ohio, assignor to General Electric Company, a corporation of New York
Filed Mar. 8, 1966, Ser. No. 532,786
4 Claims. (Cl. 184—6)

The present invention pertains to improvements in air-oil separators, and more specifically to gas turbine engine lubrication systems employing such separators.

In lubrication systems of modern gas turbine engines, pressurized oil is directed against main shaft bearings which are mounted within chambers having seals for preventing oil leakage along the shaft, and a scavenge pump continuously draws oil from the chamber. A positive air pressure is applied to the outer ends of the seals for preventing oil leakage thereacross. To insure an effective pressure differential across the seals, the chamber is vented to a lower pressure, which, in the case of an engine used for aircraft propulsion, is overboard to atmosphere.

The vent air thus discharged contains minute particles of oil, due to the turbulent conditions in the bearing compartment. The loss of oil from the vent system may be substantial, particularly when the seals pass increasing amounts of air into the chamber due to normal wear, thereby seriously hampering the lubrication capabilities of the lubrication system.

It has been proposed to pass such vent air through a separator of the centrifugal type to recover the oil from the air before it is passed to atmosphere. Previous separators, although effective in separating oil from the vent air, suffer from the disadvantage of adding extra weight and complexity to the lubrication vent system.

Accordingly, the object of the present invention is to provide for effective separation of oil from vent air with a minimum of cost and a minimum of modification of existing lubrication system components in a gas turbine engine.

In accordance with this end the present invention is utilized in a gas turbine engine having a main shaft rotatably mounted in a series of bearings lubricated by oil from a lubrication system and an accessory drive system powered from the main shaft. The lubrication system comprises a sump chamber surrounding each of the bearings and having at least one opening through which the main shaft extends and means for delivering oil to the bearings. Seal means are provided for preventing loss of oil from the sump chambers through the opening, and means for scavenging the lubricating oil from each of the sump chambers are provided. The lubrication system further comprises means for pressurizing the exterior of the sealing means with air to a pressure higher than that in the sump, thereby preventing loss of oil therefrom. The sump chambers have an outlet for venting air therefrom to maintain at least a minimum pressure differential across the seals.

The accessory drive system comprises a housing, a shaft rotatable in the housing and having thereon a gear meshing with another gear of a gear train, and means for scavenging oil from the housing. The present invention is broadly characterized by conduit means connecting all of the sump chamber outlets to the housing for discharge thereto of vent air and passageway means for discharge of the vent air from the housing comprising a plurality of radially extending passages in said shaft adjacent one side of the gear and an axial passage therein connecting with the radial passages and extending to one end of the shaft, whereby as the vent air passes by the gear and through the radial passages, it is accelerated tangentially to generate sufficient centrifugal force on entrained oil therein to force it outwardly toward the walls of the housing for removal from the housing by the scavenging means and the air passes to the axial passage for discharge therefrom.

The above and other related objects and features of the invention will be apparent from a reading of the following description of the disclosure found in the accompanying drawings and the novelty thereof pointed out in the appended claims.

In the drawings:

FIGURE 1 is a longitudinal section of a gearbox embodying the present invention with the cooperating elements of a gas turbine lubricating system shown in abbreviated diagrammatic fashion;

FIGURE 2 is an enlarged cross sectional view taken on line II—II of FIGURE 1; and FIGURE 3 is a view taken on line III—III of FIGURE 2 which shows a section of a shaft in FIGURE 1.

FIGURE 1 shows in diagrammatic form those portions of a lubrication system for a gas turbine engine (not shown) which are pertinent to the present invention. The lubrication system supplies a series of bearing assemblies 10 (only one of which is shown in highly simplified form) for suitably journaling a main shaft 12 of the gas turbine engine.

The lubrication system comprises a main supply pump 14 driven by the main shaft 12 through suitable mechanical connections including a gearbox 16. The main supply pump receives lubricating oil from a tank 18 through a conduit 20 and feeds pressurized oil through a conduit 22 to the bearing assembly 10.

The conduit 22 delivers oil to a pair of nozzles 24 which direct the oil against a bearing 28, the outer race of which is mounted on a suitable fixed support 30. The oil so discharged from the nozzles 24, after completing its lubricating function, is collected in an annular sump chamber 32, also mounted on the support 30 and having a pair of seals 34, preferably of the carbon type, which surround the main shaft 12.

The sump 30 is surrounded by an annular housing 36 fixed to the support 30 and having a pair of suitable seals 38 surrounding the main shaft 12. To prevent leakage of oil from the sump chamber 32, the annular housing 36 is pressurized to a level greater than that in sump chamber 32 by means of air from a suitable source, usually some stage of the gas turbine engine main compressor, by way of a conduit 40.

Oil is pumped from the sump chamber 32 to the tank 18 through a pair of conduits 42, 44 by means of a positive displacement return or scavenge pump 46, also driven from the main shaft 12 through suitable mechanical connections including the gearbox 16. To prevent the oil in the sump chamber 32 from flooding the seals 34, particularly when the gas turbine engine is powering an aircraft executing a steep climb or dive, the capacity of the return pump 46 is substantially greater than the capacity of the supply pump 14. As a result, air, in addition to oil, is pumped from the sump chamber 32 to the tank 18 which tends to lower the pressure in sump chamber 32 below the point at which the pump 44 will efficiently function, and increases the pressure in tank 18 to an adverse level.

Normally a small amount of air flows across the seals 34 into sump chamber 32 from the housing 36, but such flow is insufficient to raise the pressure in sump chamber 32 to an acceptable level. In order to limit the pressure in tank 18 and maintain the pressure in sump chamber 32 above the minimum level necessary for efficient operation of the return pump 46, a pressure relief valve 48 is provided which vents the excess pressure in tank 18 to the sump chamber 32 by means of a conduit 50. So connected, the sump chamber 32 will be pressurized by the flow from tank 18 and the flow across the seals 34. To prevent the pressure in sump chamber 32 from increasing to a point at which the pressure differential across the seals 34 is insufficient to prevent leakage of oil thereacross, a conduit 52 is connected to the conduit 50 to carry away the excess pressure to a suitable discharge or vent. When gas turbine engines are used for aircraft propulsion, it is customary to discharge the vent air overboard, i.e., to the atmosphere.

In normal operation there will generally be a flow of vent air to the atmosphere. This vent air contains minute droplets of oil which are suspended therein by the turbulent conditions arising from the discharge of lubricating oil against the bearing 28.

The seals 34 have a tendency to become less efficient in normal engine operation and as a consequence air flow into the lubrication chamber increases. This in turn increases the flow of air to the atmosphere in maintaining the desired pressure level in the lubrication chamber. Such increased flow rate results in a substantially greater amount of entrained oil in the vent air.

To prevent, or at least greatly minimize, loss of oil at all expected vent air flow rates, the gearbox 16, an existing engine component, is modified to separate the oil from the sump vent air before it passes to the atmosphere, thereby accomplishing the stated object of the invention in a simplified fashion which adds little, if any, extra weight to the engine.

As illustrated in FIGURE 1, the gearbox 16 provides a means through which to drive the supply and return pumps 14, 46. However, other gearboxes often found in the accessory power train of an engine may also be modified to achieve equal results as will be apparent to those skilled in the art.

Referring now to FIGURES 1 and 2, the gearbox 16 comprises a housing 56 having an input shaft 58, driven from engine shaft 12 and journaled by bearings 62, 64. A cap 66 is secured to housing 56 by bolts 68 and seals (by means not shown), the access opening for the drive connection to shaft 58 as well as securing the bearing 62 in place. A bevel gear 60 is formed on shaft 58 and meshes with another bevel gear 70 mounted on a hollow shaft 72 which is journaled in bearings 74, 76 suitably mounted on the housing 56 by end caps 75, 77 which seal the housing 56 at the right hand end while providing access for a drive connection to the shaft 72. The shaft 72 has an integrally formed gear 78 for driving an idler gear 80 (only part of which is shown) which in turn drives other gears, which are indicated only by the representation of a mechanical connection to the supply and return pumps 14, 46.

As shown in detail in FIGURES 2 and 3, the hollow shaft 72 has, adjacent the gear 78 and on the side away from gear 70, a section 82 of increased wall thickness having a plurality of radial holes 84 therein. A series of holes 85, disposed parallel to the axis of the shaft 72, are located in the hub of gear 78 and, in part, pass through the portion 82. The hollow shaft 72 has a first interior diameter $a$ which necks down at its outer end on a beveled surface 86, to a reduced diameter $b$.

A seal 90 is provided at the open end of the shaft 72 for cooperation with a sleeve 88 to form a liquid seal. Thus it can be seen that the housing 56 is, in effect, a sealed chamber. An inlet to housing 56 is provided by a port 69 which connects with the conduit 52. The outlet from housing 56 is by way of the radial holes 84 to the hollow shaft 72 through a conduit 94 to a valve 92 which is set to maintain a predetermined pressure in the vent system such that the pump 46 operates efficiently, especially during high altitude conditions when the atmospheric pressure is low. When this pressure is exceeded, the valve 92 opens to vent air to atmosphere, or overboard.

Oil may be introduced into housing 56 to lubricate the gears. This oil, and/or oil retained in the housing as a result of operation of the present separator, is collected in a sump chamber 98 and then returned to the suction side of pump 46 through a conduit 100. A baffle 71 provides a quiet spot for the oil to settle into sump 98.

In operation the shafts 58 and 72 are driven at a relatively high rate of speed by the main shaft 12, which is at all times sufficiently great to effect a separating function for discharge of essentially oil-free air from the gearbox by way of the valve 92.

The air to be vented from lubrication chamber 32 and/or oil tank 18 passes into housing 56 and then travels through the holes 84 when the pressure in casing 56 is greater than the pressure in conduit 94. Any substantial air flow will, of course, occur only when pressure in conduit 94 is sufficient to open valve 92.

The air-oil mixture follows a dual path to the holes 84, with the greater portion of the mixture passing around the gear 78 and a lesser portion passing through the holes 85 in the hub of gear 78. The mixture flowing around the gear 78 is initially accelerated into a generally tangential path relative to the axis of shaft 72 by the rotating teeth of gear 78. The remaining oil-air mixture passes through the holes 85 and into the grooves formed thereby in the raised portion 82 of the shaft 72 where it is tangentially accelerated. When the mixture is so accelerated by these grooves, the larger particles of oil are forced outwardly by centrifugal force toward the walls of housing 56.

As the air-oil mixture, having a reduced content of oil, enters the holes 84, its tangential velocity is further increased because it is constrained to rotate at or approaching the speed of the shaft 72. The holes 84 have a length which enables a sufficient dwell of the mixture in this radial path to a point where centrifugal force acts on most, if not all, of the remaining oil to force it outwardly and maintain it within housing 56.

The separated oil flows to the sump chamber 98 for discharge through conduit 100 to the lubrication system, and the de-oiled air passes to the interior of shaft 72 and from there to the pressure relief valve 92 for discharge to the atmosphere.

The beveled edge 86 in the interior of shaft 72 performs an additional separating function in that vent air must pass thereagainst in flowing to the conduit 94. As this occurs, any remaining oil particles have an opportunity to collect on the surface 86, and centifugal force can act thereon to force the oil outwardly through the holes 84. The effectiveness of the separating function is thus further enhanced by this feature.

When a gas turbine engine is shut down, oil may sometimes accumulate in gearboxes that are located near the lowermost point on the engine. Should, for any reason, oil accumulate in the casing 56 to a point where the interior of the hollow shaft 72 is flooded, the beveled edge 86 serves as a dam and also acts to force the oil outwardly, through the holes 84, to minimize oil loss when the gas turbine engine is started.

The invention thus described has particular usefulness in the separation of oil from air from a lubrication system of a gas turbine engine used for aircraft propulsion because it enables performance of this function with a minimum of modification to existing engine components and adds little or no weight.

Modifications of the described embodiment will occur to those skilled in the art and the scope of the invention is therefore to be derived solely from the following claims.

Having thus described the invention, what is claimed as novel and desired to be secured by Letters Patent of the United States is:

1. In a gas turbine engine having a main shaft rotatably mounted in a series of bearings lubricated by oil from a lubrication system and an accessory drive system powered from said main shaft, said lubrication system comprising:

a sump chamber surrounding each of said bearings and having at least one opening through which said main shaft extends, means for delivering lubricating oil to said bearings,
seal means for preventing loss of oil from said sump chambers through asid opening,
means for scavenging said lubricating oil from each of said sump chambers,
means for pressurizing the exterior of said sealing means with air to pressure higher than that in said sump and causing a flow across said sealing means, thereby preventing loss of oil therefrom,
said sump chambers having an outlet for venting air therefrom to maintain at least a minimum pressure differential across said seals,
and said accessory drive system comprises:
a housing,
a shaft rotatable in said housing and having thereon a spur gear meshing with another gear of a gear train,
means for scavenging oil from said housing,
the improvement which comprises conduit means connecting all of said sump chamber outlets to said housing for discharge thereto of vent air,
passageway means for discharge of said vent air from said housing comprising a plurality of radially extending passages in said shaft adjacent one side of said gear and an axial passage therein connecting with said radial passages and extending to one end of said shaft,
whereby as said vent air passes by said gear and through said radial passages it is accelerated tangentially to generate sufficient centrifugal force on oil entrained therein to force it outwardly toward the walls of said housing for removal from said housing by said scavenging means and said air passes to said axial passage for discharge therefrom.

2. A combination as in claim 1 wherein
said axial passage is cylindrical and has a first diameter to which said radial passages extend,
said first diameter necks down on an abrupt shoulder adjacent said radial passages and outwardly thereof to a smaller diameter,
whereby as said vent air passes to the outlet therefor, small amounts of oil not previously separated may collect on said shoulder and be returned through radial passages to said housing.

3. A combination as in claim 1 wherein
said conduit means is disposed to discharge said vent air into said housing to the other side of said gear,
whereby said vent air passes around said gear in entering said radial holes and is thereby further accelerated tangentially.

4. A combination as in claim 3 wherein
said gear is a spur gear and has a plurality of holes parallel to the axis of said shaft and passing through the hub of said gear and said shaft has grooves conforming in part to said holes and extending between adjacent radial holes,
whereby a portion of the vent air passes through said passages and into said grooves where it is tangentially accelerated to generate sufficient centrifugal force on oil therein to force it outwardly toward the wall of said chamber and said vent air entering said radial passages has a reduced content of oil.

References Cited
UNITED STATES PATENTS

| | | | |
|---|---|---|---|
| 2,283,022 | 5/1942 | Wallgren | 308—36.3 |
| 2,779,435 | 1/1957 | Hoeltje | 55—409 |
| 2,888,097 | 5/1959 | Scheffler | 184—6 |
| 2,895,564 | 7/1959 | Borie | 55—409 |

LAVERNE D. GEIGER, *Primary Examiner.*

H. S. BELL, *Assistant Examiner.*